(12) United States Patent
Plummer et al.

(10) Patent No.: US 8,874,454 B2
(45) Date of Patent: Oct. 28, 2014

(54) SYSTEMS AND METHODS FOR ASSESSING A ROOF

(71) Applicant: State Farm Mutual Automobile Insurance Company, Bloomington, IL (US)

(72) Inventors: Bryan Allen Plummer, Urbana, IL (US); Drew Cross, Geneseo, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 14/047,873

(22) Filed: Oct. 7, 2013

(65) Prior Publication Data

US 2014/0278570 A1    Sep. 18, 2014

Related U.S. Application Data

(60) Provisional application No. 61/799,452, filed on Mar. 15, 2013.

(51) Int. Cl.
    *G06Q 40/08*    (2012.01)
(52) U.S. Cl.
    CPC ................................ *G06Q 40/08* (2013.01)
    USPC .......................................................... 705/4
(58) Field of Classification Search
    CPC ...................................................... G06Q 40/08
    USPC .......................................................... 705/4
    See application file for complete search history.

(56) References Cited

U.S. PATENT DOCUMENTS

| | | | |
|---|---|---|---|
| 5,950,169 A | 9/1999 | Borghesi et al. | |
| 8,510,196 B1 | 8/2013 | Brandmaier et al. | |
| 8,537,338 B1* | 9/2013 | Medasani et al. | 356/4.01 |
| 8,651,206 B2* | 2/2014 | Slawinski et al. | 180/9.32 |
| 2005/0108065 A1 | 5/2005 | Dorfstatter | |
| 2007/0179868 A1 | 8/2007 | Bozym | |
| 2009/0119132 A1 | 5/2009 | Bolano et al. | |
| 2009/0138290 A1 | 5/2009 | Holden | |
| 2009/0265193 A1* | 10/2009 | Collins et al. | 705/4 |
| 2011/0302091 A1 | 12/2011 | Hornedo | |
| 2013/0262153 A1* | 10/2013 | Collins et al. | 705/4 |

OTHER PUBLICATIONS

U.S. Appl. No. 13/647,098, filed Oct. 8, 2012.
U.S. Appl. No. 13/836,695, filed Mar. 15, 2013.
U.S. Appl. No. 13/839,634, filed Mar. 15, 2013.
U.S. Appl. No. 14/047,844, filed Oct. 7, 2013.
UTC Spotlight: Superstorm Sandy LiDAR Damage Assessment to Change Disaster Recovery, Feb. 2013.
Office Action in U.S. Appl. No. 13/647,098, dated Apr. 26, 2013.
Office Action in U.S. Appl. No. 13/647,098, dated Nov. 1, 2013.

* cited by examiner

*Primary Examiner* — Bruce I Ebersman
(74) *Attorney, Agent, or Firm* — Marshall, Gerstein & Borun LLP; Randall G. Rueth

(57) ABSTRACT

A damage assessment module operating on a computer system automatically evaluates a roof, estimating damage to the roof by analyzing a point cloud of a roof. The damage assessment module identifies individual shingles from the point cloud and detects potentially damaged areas on each of the shingles. The damage assessment module then maps the potentially damaged areas of each shingle back to the point cloud to determine which areas of the roof are damaged. Based on the estimation, the damage assessment module generates a report on the roof damage. The report may be used to determine the financial cost of the damage and/or determine whether the roof should be replaced or repaired. In addition to eliminating the need for an estimator to physically climb onto a roof for evaluation purposes, the damage assessment module improves the consistency and accuracy associated with estimating damage to a roof.

13 Claims, 7 Drawing Sheets

SYSTEMS AND METHODS FOR ASSESSING A ROOF

CROSS-REFERENCE TO RELATED APPLICATIONS

This patent claims priority to U.S. Provisional Application No. 61/799,452 filed Mar. 15, 2013, entitled "System and Method of Assessing Hail Damage," which is hereby incorporated by reference for all purposes.

FIELD OF THE DISCLOSURE

This disclosure relates to systems and methods for assessing roof damage for insurance companies.

BACKGROUND

Insurance companies spend considerable amounts of resources estimating damage caused to shingles. Currently an estimator needs to be on site to determine whether or not a roof needs to be replaced. Generally, the estimator uses a subjective assessment of the roof. Unfortunately, subjective assessments generally do not provide a repeatable or consistent approach, resulting in inconsistent and unreliable results. For example, once on the roof, different lighting conditions and shingle types may make it very difficult, even for an experienced estimator, to assess the amount of damage to a roof.

In addition to providing inadequate results, a subjective assessment may expose the estimator to dangerous conditions. For example, the estimator exposes himself or herself to the risk of falling. Windy or rainy conditions, which are common in many locales, enhance this risk.

SUMMARY

A system and method for estimating roof damage provides an analytical approach that is repeatable and consistent, regardless of who is doing the estimation. The systems and methods may be automated, removing the subjectivity of a person doing the estimation and helping new and inexperienced estimators produce consistent results regardless of the level of training and experience.

A system and method for estimating damage to a roof includes causing a processor to generate, from a first point cloud representing a roof, a second point cloud representing a shingle. The system and method further includes causing a processor to compare the second point cloud to a model point cloud, the model point cloud representing a model shingle. The system and method also includes causing a processor to identify, based on the comparison, a first set of points, correlating each point within the first set of points to a representation of a point of damage. The system and method includes causing a processor communicatively connected to a memory to identify a second set of points, the second set including at least one point from the first set, correlating the second set to a representation of a damaged region of the roof. Further, the system and method includes generating and storing to the memory a report based on the second set for subsequent retrieval and use in estimating damage to at least part of the roof.

A system and method for generating a model of an undamaged roof shingle includes causing a processor to identify a set of points, the set comprising points from a first point cloud representing a first shingle and points from a second point cloud representing a second shingle. The system and method further includes causing a processor to calculate an average nearest-neighbor distance for the set. The system and method also includes causing a processor to calculate a threshold distance based on the determined average. The system and method includes causing a processor to store the set to a memory as a point cloud representing a model roof shingle to be later retrieved and compared to point clouds of individual shingles.

A tangible computer-readable medium including non-transitory computer readable instructions to be executed on one or more processors of a system for identifying roof damage, the instructions when executed causing the one or more processors to generate, from a first point cloud representing a roof, a second point cloud representing a first shingle. The instructions further cause the one or more processors to compare the second point cloud to a model point cloud, the model point cloud representing a model shingle. The instructions also cause the one or more processors to identify, based on the comparison, a first set of points. The instructions cause one or more processors to correlate each point within the first set to a point of damage to the first shingle. The instructions also cause the one or more processors to identify a second set of points, the second set including at least one point from the first set. The instructions additionally cause the one or more processors to correlate the second set to a damaged region of the roof. The instructions further cause the one or more processors to store the second set to the memory for subsequent retrieval and use in estimating a condition of at least part of the roof.

DETAILED DESCRIPTION

A damage assessment module operating on a computer system automatically evaluates a roof, estimating damage to the roof by analyzing a point cloud. Based on the analysis, the damage assessment module generates a report on the roof damage. The report may be used to determine the financial cost of the damage and/or determine whether the roof should be replaced or repaired. The damage assessment module eliminates the need for an estimator to physically climb onto a roof for evaluation purposes. Moreover, the damage assessment module completely eliminates the need for a human estimator to travel to the physical site where the roof is located. The damage assessment module also improves the consistency and accuracy associated with estimating damage to a roof. While environmental factors, such as poor lighting, can negatively affect the consistency and reliability of current damage estimation techniques, the damage assessment module greatly reduces the significance of such factors. Because the damage assessment module relies on an objective analysis of a detailed point cloud rather than a subjective opinion of a human estimator relying on a visual inspection of the roof, the damage assessment module enables a high level of consistency and reliability with regard to estimating damage to roofs. Finally, due to the automated nature of the damage assessment module and the objective analysis implemented by the damage assessment module, human estimators will be capable of using the damage assessment module to produce high quality results, regardless of the level of training or experience.

System Overview

Figure 1:
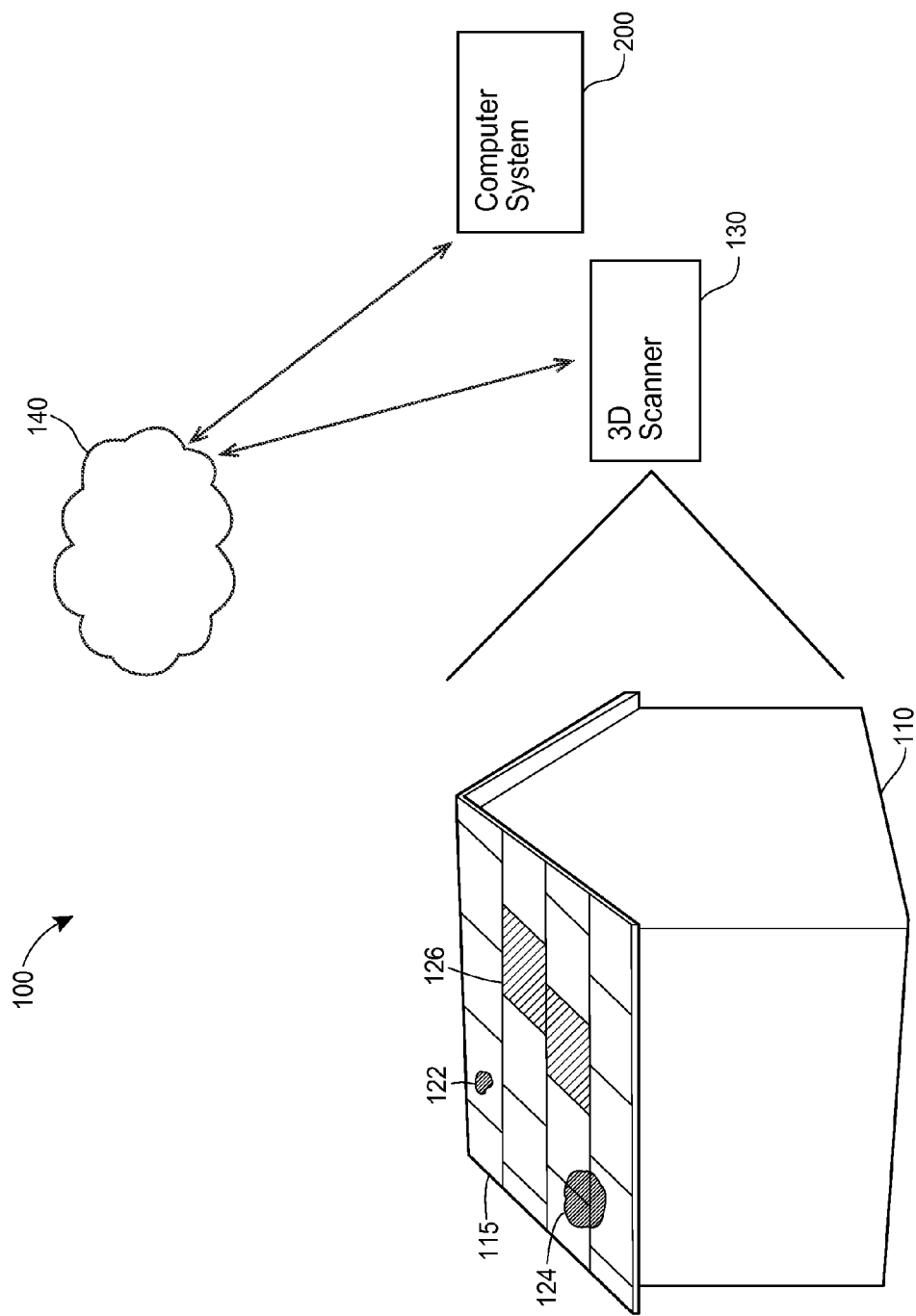
FIG. 1 illustrates a block diagram of an example system including a computer system for evaluating a roof of a structure in accordance with the described embodiments.

FIG. 1 illustrates a block diagram of an example system 100 including a computer system 200 for evaluating a roof 115 of a structure 110 in accordance with the described embodiments. The roof 115 includes potential areas of damage 122, 124, and 126.

The example system 100 includes a 3D scanner configured to scan an object and generate a point cloud. The 3D scanner 130 may implement any of a number of techniques to scan an object, including, for example, time-of-flight techniques or triangulation techniques. The 3D scanner 130 may implement systems utilizing laser, white light, audio, infrared, or any other technology suitable for scanning the roof 115.

In operation, the 3D scanner 130 generates a point cloud based on a scan of the roof 115 and transmits the point cloud via a network 140. The computer system 200 receives the point cloud via the network 140, storing the point cloud to memory. The computer system 200 then estimates damage to the roof 115 by analyzing the point cloud. For example, the computer system may identify points corresponding to the damaged areas 122, 124, and 126. After estimating the location and/or extent of damage to the roof 115, the computer system 200 may generate a report of the damage.

In some embodiments, the computer system 200 may receive the point cloud from another device or system. For example, the computer system 200 may receive the point cloud from a computer system such as a server. The computer system 200 may also receive the point cloud from a storage device connected to the computer system 200 (such as a USB device or an SD card, for example).

Figure 2:
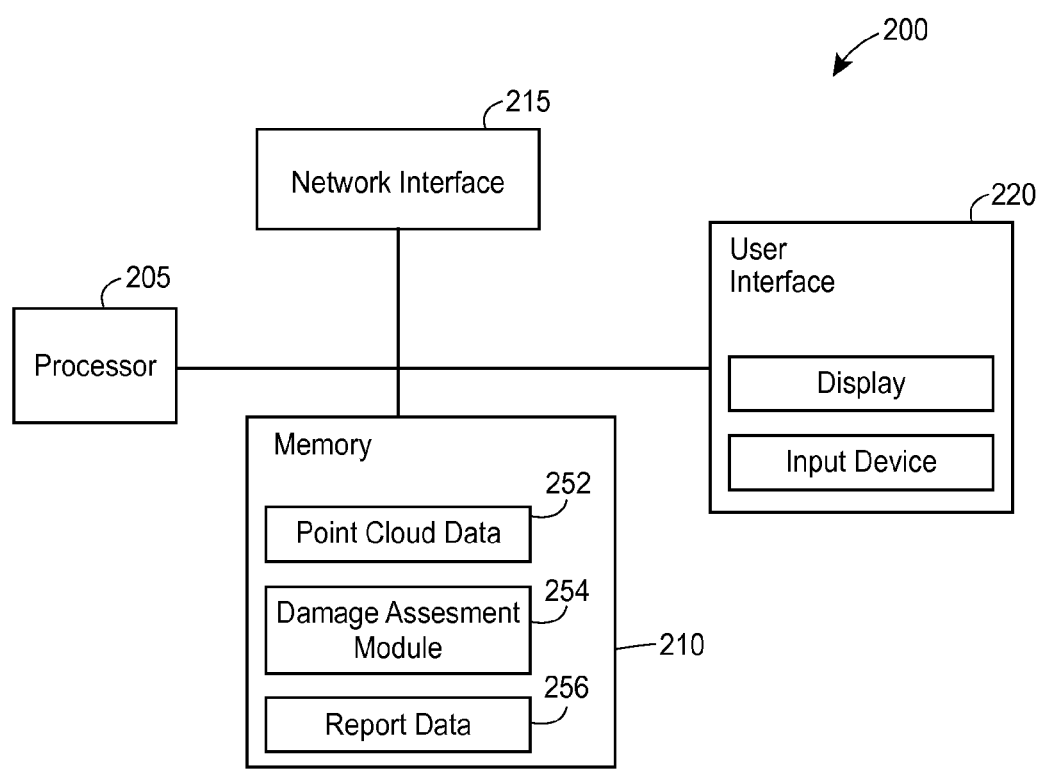
FIG. 2 illustrates a block diagram of an example computer system on which a method for evaluating a roof may operate in accordance with the described embodiments.

FIG. 2 illustrates a block diagram of an example computer system 200 on which a method for evaluating a roof may operate in accordance with the described embodiments. The computer system 200 may take the form of any general purpose or special purpose computer or computing device. For example, the computer system 200 may be a personal computer, server, laptop, tablet, a set-top box, a multiprocessor system, a microprocessor system, or any other type of computer. Further, the computer system 200 may be a distributed computing environment including multiple computing devices.

The computer system 200 includes one or more processors 205, a computer-readable memory 210, a network interface 215, a user interface 220, and a system bus 250. The processor 205 communicates with the other components of the computer 200 via the system bus 250. The processor 205 is configured to fetch and execute instructions stored at the memory 210.

The network interface 215 is configured to establish communication via a network and may include an antenna, a port for wired connection, a connection to a modem, a connection to a router, or some combination thereof. The User Interface (UI) 210 includes a display 262 and an input device 264 in this example. Generally speaking, the UI 210 may include any suitable input or output devices, such as a touchscreen, a keyboard, a mouse and/or speakers. In some embodiments, some or all of the UI 210 may be remotely located relative to the other components of the computer system 200 and the UI 210 may communicate with the components of the computer system 200 via the network interface 215.

The memory 210 is configured to store data, including instruction sets making up one or more services or programs and any data operated on or produced by such services or programs. The memory 210 may include volatile (e.g., RAM) and/or non-volatile memory (e.g., a harddisk) and may be removable or non-removable memory. More particularly, the memory 210 includes point cloud data 252, a damage assessment module 254, and report data 256. The point cloud data 252 includes one or more point clouds representing a surface of a structure, roof and/or shingle, each point cloud being a set of data points in a three-dimensional coordinate system. The point cloud data 252 may include point clouds used as input for the damage assessment module 254, as well as point clouds generated or modified by the damage assessment module 254. Each data point in a point cloud corresponds to a particular point on the surface of the structure/roof/shingle. As discussed further below, the damage assessment module 254 is a program for estimating damage to a roof. The report data 256 is generated in response to the estimation performed by the damage assessment module 254. The report data may be produced by the damage assessment module 254 or by a reporting module (not shown).

The processor 205 may perform the methods or operations described herein. In some instances, performance of certain parts of the methods or operations described herein may be distributed among one or more processors residing across a plurality of machines. The one or more processors may share a similar geographic location in some instances (e.g., a server farm), or may be distributed across a number of geographically distinct areas. Moreover, the one or more processors may operate to support performance of relevant operations in a "cloud computing" environment. For example, at least some of the operations may be performed by a group of computers or by the previously described plurality of machines, wherein the operations are accessible via a network (accessible by, e.g., the network interface 215).

In operation, the computer system 200 receives point cloud data at the network interface 215 (via, e.g., the network 140 shown in FIG. 1). Alternatively, the point cloud data 252 may be received at the UI 210 or at a peripheral device interface (not shown), such as a Universal Serial Bus (USB) interface. In any event, the received point cloud data is stored as at least part of the point cloud data 252 at the memory 210. Any type of communication protocol may be implemented at the computer system 200 for receiving the point cloud data. For example, in some embodiments the computer system 200 receives the point cloud data 252 via a transfer initiated by another system, while in other embodiments the computer system 200 requests the point cloud data 252 from another system, resulting in the other system transferring the point cloud data 252 to the computer system 200.

In further operation, the processor 205 executes the damage assessment module 254 to estimate damage to a roof by analyzing a point cloud representing the roof or a structure with the roof. As discussed in further detail below, estimating damage to the roof may include: (i) identifying individual shingles (i.e., segmenting shingles) within the point cloud, (ii) identifying points of potential damage to each of the shingles, and (iii) determining which areas of the roof are damaged based on the identified points of potential damage to the shingles.

Finally, the computer system 200 may generate a report of the estimated damage to the roof and save the report to the memory 210 as at least part of the report data 256. The report may include information pertaining to the location of the damaged areas on the roof, as well as the extent of damage to the roof. The report may be a file or data set including information pertaining to some or all of the estimated damage to the roof. Furthermore, the report may enable various textual or graphical representations of the estimated damage to be generated (e.g., images, video, diagrams, charts, text, etc.). For example, in some embodiments an output may be provided at the display 262 (such as a television or computer monitor) based on the report. In other instances, a printer (not shown) may print one or more documents based on the report. The printer may be connected to a peripheral device interface at the computer system 200 (not shown), or may be in network communication with the computer system 200 via the network interface 215. In still other instances, the report may be saved as a file and transferred to another system (via, e.g., the network interface 215).

Figure 3:
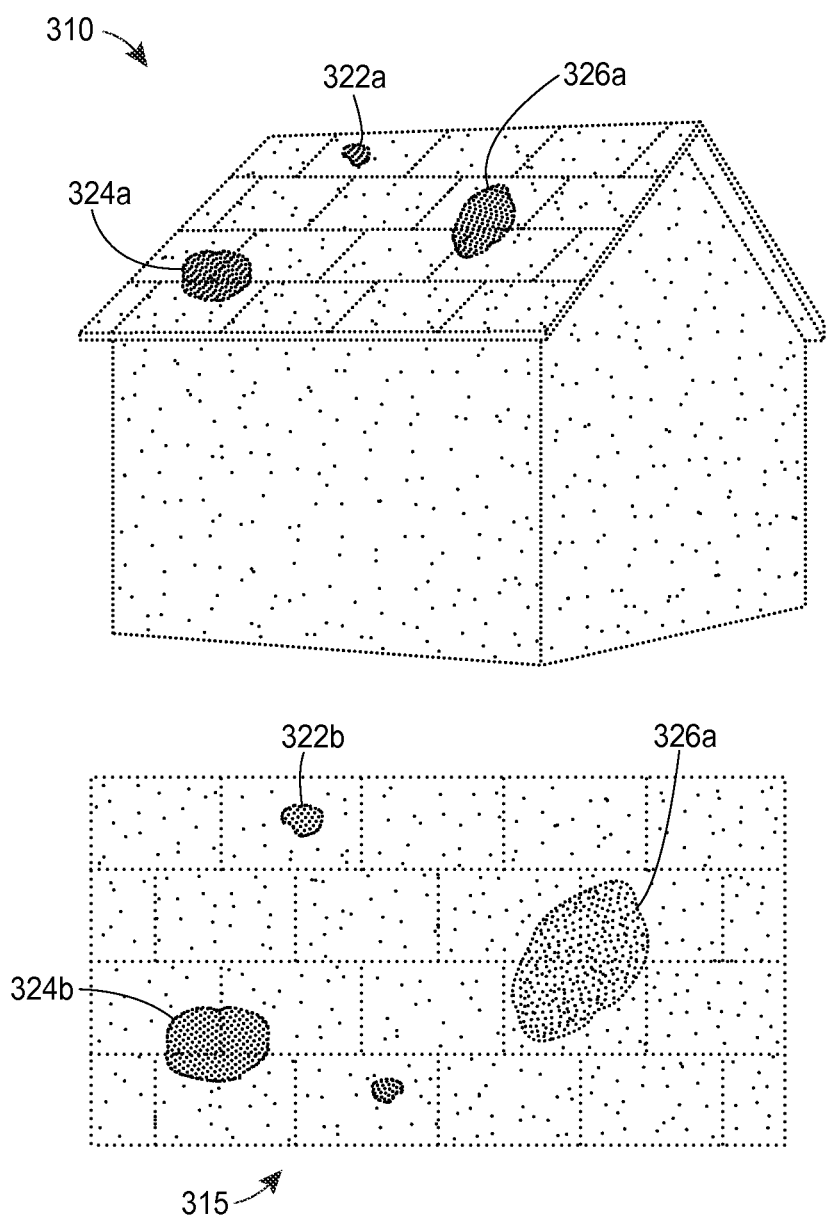
FIG. 3 illustrates an example point cloud of a structure and an example point cloud of a roof in accordance with the described embodiments.

FIG. 3 illustrates an example point cloud 310 of the structure 110 and an example point cloud 315 of the roof 115 in accordance with the described embodiments. The point cloud 310 includes areas 322a, 324a, and 326a of potential damage. The point cloud 315 includes areas 322b, 324b, and 326b of potential damage.

The point cloud 310 may be received and stored at a computer system (such as the computer system 200 shown in FIG. 2). The computer system may identify the points from the point cloud 310 corresponding to the roof 115 by identifying features associated with the roof 115. For example, shingles, which are typically only found on a roof, generally have a distinct shape and pattern in comparison to the rest of a structure. Thus, the computer system may identify points corresponding to shingles on the roof 115 based on the shapes of the shingles. The computer system may then generate the point cloud 315 based on the identified points. In some embodiments, the computer system may receive the point cloud 315 from a second system rather than generating the point cloud 315 from the point cloud 310. For example, the computer system may receive the point cloud 315 from a 3D scanner, a second computer device, a network device on a network, etc.

As discussed further below, the computer system may identify one or more individual shingles represented in the point cloud 315. In some instances, the computer system may generate a point cloud corresponding to each shingle (shingle point cloud). The shingle point clouds may be analyzed to identify points representing potential areas of damage to the shingle. In some instances, points identified as potential damage may then be mapped to a point cloud representing the roof or structure associated with the shingles (such as the original point cloud from which the shingle point clouds were identified). Using the points identified as potential damage, the computer system may identify groups or clusters of potential damage to identify areas on the roof having physical features consistent with roof damage.

Example Methods for Estimating Damage to a Roof Based on a Point Cloud

Figure 4:
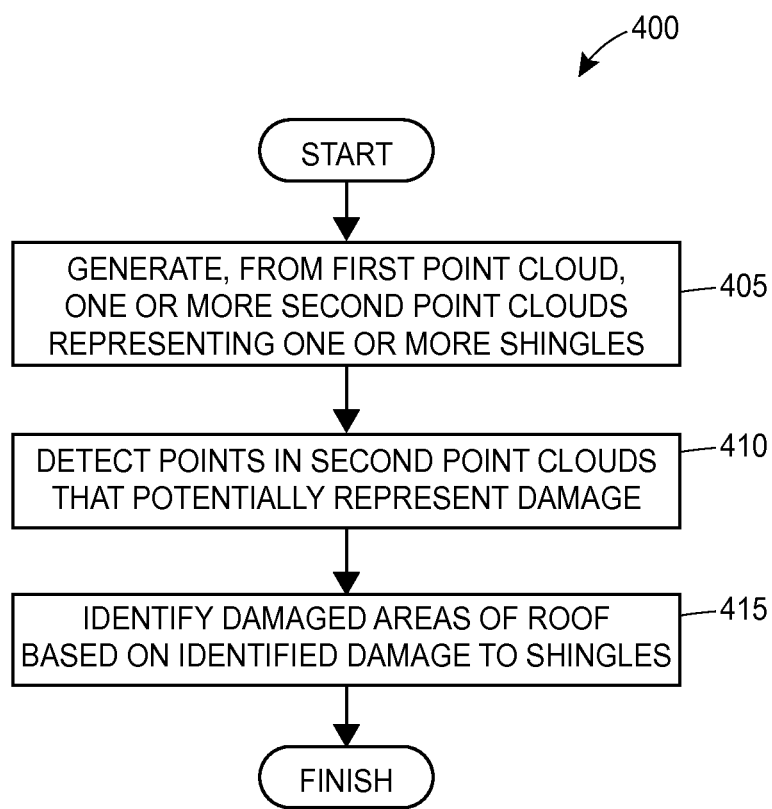
FIG. 4 illustrates an example method for estimating damage to a roof in accordance with the described embodiments.

FIG. 4 illustrates an example method 400 for estimating damage to a roof in accordance with the described embodiments. The method 400 may be implemented, in whole or in part, on one or more devices or systems such as the computer system 200 of FIG. 2. The method 400 may be saved as a set of instructions, routines, programs, or modules on memory such as the memory 210 shown in FIG. 2. In particular, the method 400 may be saved as at least part of the damage assessment module 254 shown in FIG. 2. In particular, the method 400 may be saved as at least part of the damage assessment module 254 shown in FIG. 2.

The method 400 begins when a computer system generates, based on a point cloud of a roof (roof point cloud), point clouds representing individual shingles (shingle point cloud) (block 405). By identifying individual shingles (i.e., shingle segmentation) on the roof, the computer system may identify areas of potential damage to individual shingles, allowing the computer system to estimate damage to the roof as a whole. Identifying damage to particular shingles may be simpler than identifying damage to the roof as a whole because shingles tend to have consistent and predictable physical characteristics, such as shape and size. Consequently, as described below, shingles may offer the benefit of having a reliable reference model to which they may be compared.

After generating the shingle point clouds, the computer system detects which points in each of the shingle point clouds, if any, represent points of potential damage to the shingles (damaged points) (block 410). In typical embodiments, the computer system detects damaged points by comparing each of the shingle point clouds to a model point cloud. The model point cloud generally represents an undamaged shingle, though it may have characteristics consistent with normal wear and tear. Thus, for example, the shingle cloud may be superimposed on the model point cloud and points corresponding to undamaged areas of the shingle will be near one or more points in the model point cloud. Points corresponding to damaged areas of the shingle, on the other hand, will tend to be further away from points in the model point cloud. Consequently, outlier points in each of the shingle point clouds may be identified as damaged points.

After detecting the damaged points by comparing the shingle point clouds to a model point cloud, the computer system may map the damaged points to the roof point cloud and identify clusters of damaged points to estimate which areas of the roof are damaged (block 415). In some embodiments, the computer system determines which, if any, of the identified clusters represent a false positive. The computer system may also, in certain circumstances, identify an extent or severity of the damage associated with each cluster.

Figure 5:
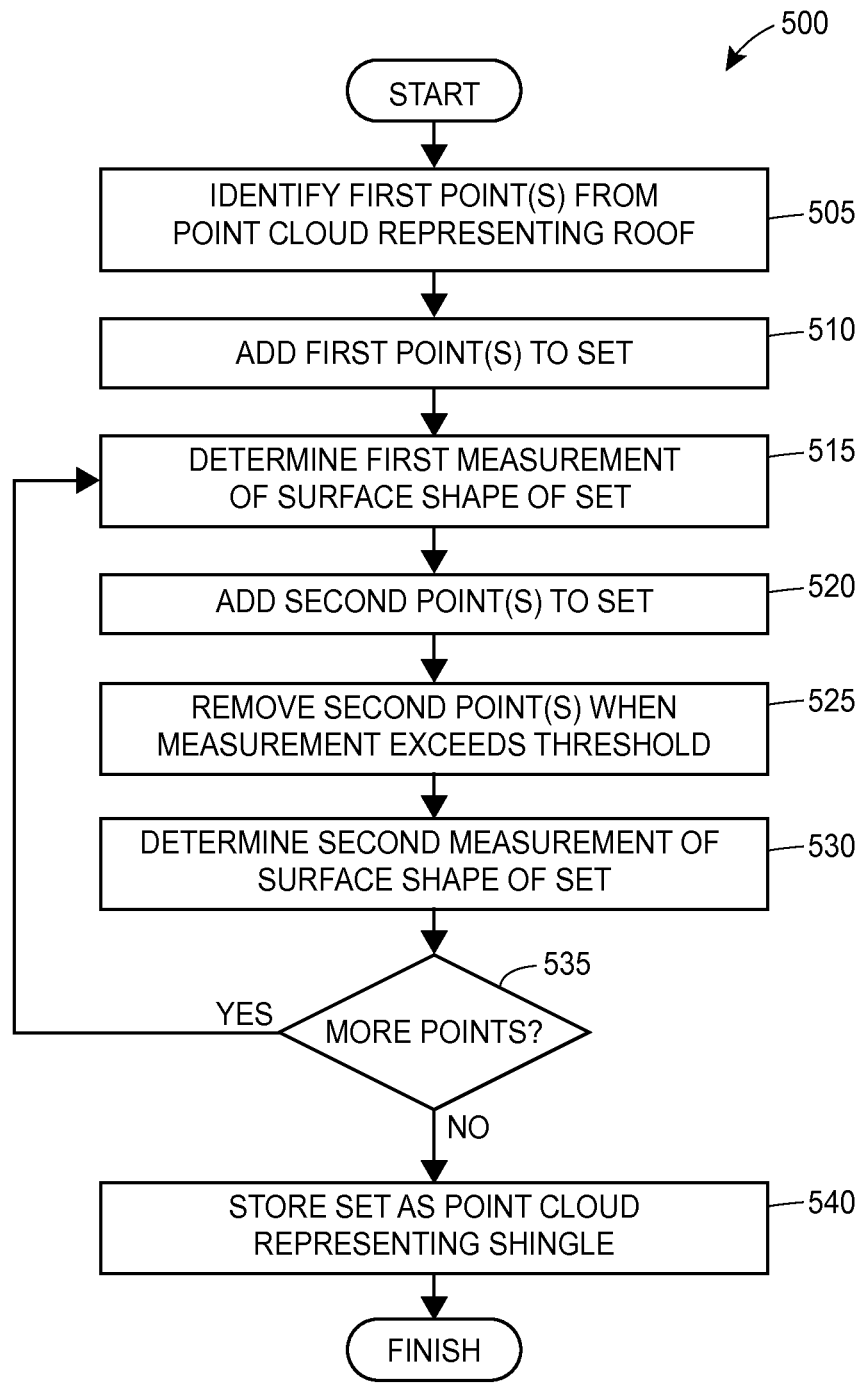
FIG. 5 illustrates a method for identifying individual shingles on a roof in accordance with the described embodiments.

FIG. 5 illustrates a method 500 for identifying individual shingles on a roof in accordance with the described embodiments. The method 500 may be implemented, in whole or in part, on one or more devices or systems such as the computer system 200 of FIG. 2. The method 500 may be saved as a set of instructions, routines, programs, or modules on memory such as the memory 210 of FIG. 2. In particular, the method 500 may be saved as at least part of the damage assessment module 254 shown in FIG. 2.

The method 500 begins when a computer system identifies a first point from a point cloud representing a roof (block 505). The computer system adds the first point to a set (block 510). The computer system then calculates a first measurement of the surface shape of the set (block 515). The computer system adds a second (unevaluated) point (i.e., a point not previously added to the set) to the set (block 520) and determines a second measurement of the surface shape of the set (block 525). When the difference between the first and second measurement exceeds a threshold, the second point is removed from the set (block 530).

Figure 6:
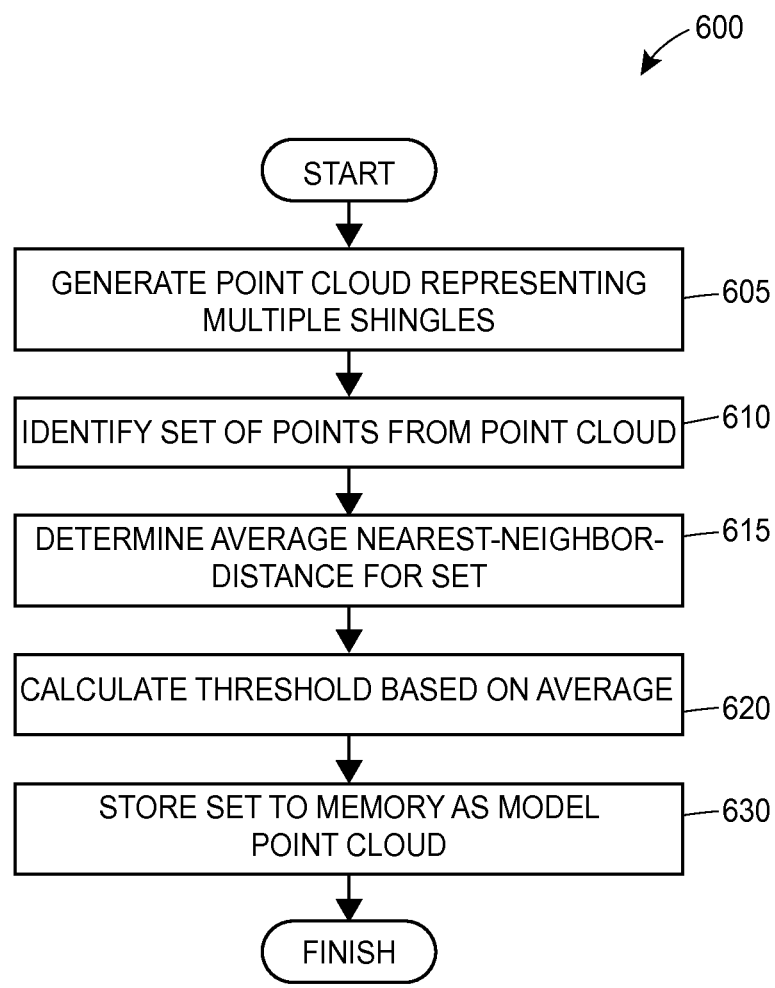
FIG. 6 illustrates an example method for generating a point cloud representing a model shingle in accordance with the described embodiments.

The computer system may determine whether there are unevaluated points in the point cloud (block 535). If there are points the computer system has not evaluated for adding to the set, the computer system may implement blocks 515-535 with regard to the unevaluated points. If there are no more points to evaluate, the computer system may store the set as a point cloud representing a shingle (block 540). In some instances, the method 500 may be implemented multiple times to identify multiple objects from the point cloud representing the property FIG. 6 illustrates an example method 600 for generating a point cloud representing a model shingle in accordance with the described embodiments. The method 600 may be implemented, in whole or in part, on one or more devices or systems such as the computer system 200 of FIG. 2. The method 600 may be saved as a set of instructions, routines, programs, or modules on memory such as the memory 210 of FIG. 2. In particular, the method 600 may be saved as at least part of the damage assessment module 254 shown in FIG. 2.

The method 600 begins when a computer system generates a point cloud representing two or more shingles (aggregate point cloud) (block 605). The computer system aligns the shingle point clouds in a normalized coordinate system. The shingle point clouds are aligned at one or more reference points, such as along a center point associated with each of the shingle point clouds. The resulting aggregate point cloud includes points from each of the two or more shingle point clouds.

Next, the computer system may select a set of points (block 610). The set of points may be selected by sampling the aggregate point cloud. Alternatively, the set of points may include all of the points from the aggregate point cloud.

The computer system may then determine the mean nearest-neighbor distance for the set of points (block 615). The computer system may also calculate the standard deviation of the squared Euclidean distance of all the points in the set.

The computer system may calculate a threshold based on the mean nearest-neighbor distance for the set of points (block 620). For example, the threshold may be calculated as a scaled number of standard deviations away from the mean. The computer system may save the set of points to a memory as a model point cloud (block 630). After the model point cloud has been created, the shingle point clouds may be compared to the model point cloud. Each point from the model point cloud may be compared, point-by-point, to each of the points in the shingle point clouds. If any point in the model point cloud is farther away from its nearest-neighbor in the shingle point cloud than the predetermined threshold, the point in the model point cloud may be marked as potentially damaged. The points marked as potentially damaged may be mapped back to the original roof or structure point cloud.

Figure 7:
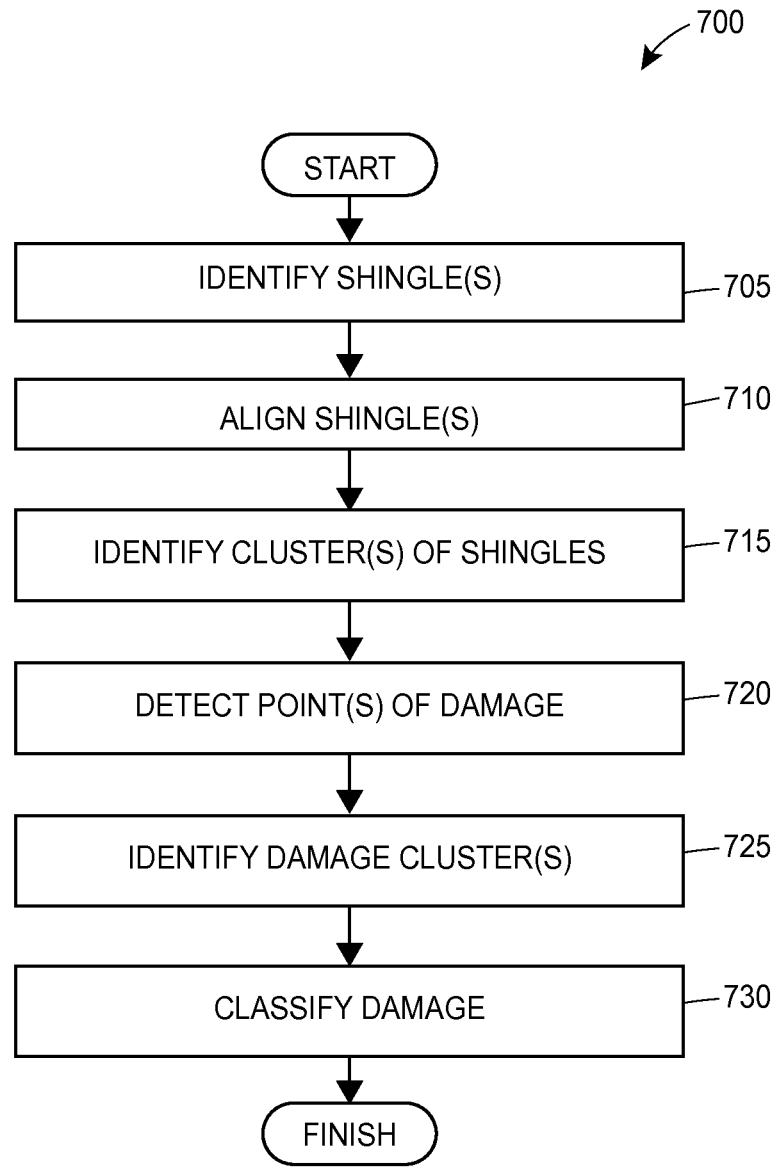
FIG. 7 illustrates an example method for estimating damage to a roof in accordance with the described embodiments.

FIG. 7 illustrates an example method 700 for estimating damage to a roof in accordance with the described embodiments. The method 700 may be implemented, in whole or in part, on one or more devices or systems such as the computer system 200 of FIG. 2. The method 700 may be saved as a set of instructions, routines, programs, or modules on memory such as the memory 210 of FIG. 2. In particular, the method 700 may be saved as at least part of the damage assessment module 254 shown in FIG. 2.

The method 700 begins when a computer system identifies individual shingles from a point cloud representing a roof or a structure with a roof (i.e., the computer system segments the point cloud into single shingle segments) (block 705). This may include generating shingle point clouds corresponding to each shingle. While some embodiments implement region growing segmentation, the computer system may implement any segmentation method (such as planar segmentation or difference of normals segmentation, for example). Region growing starts by adding a single point or small group of points to a set. Then, the curvature and/or smoothness of the set is calculated. If the smoothness or curvature goes over a specified value, the computer system may remove the added point or small group from the set. This process may occur in an iterative manner, with the computer system adding and removing points depending on how the shape of the set is affected. Eventually, the cluster of points remaining in the set after being added and evaluated represent a single segment or shingle.

The computer system may align all of the segmented shingles to a common alignment (block 710). Alignment may include rotating and translating the roof point cloud so that its centroid is located at an origin point of a 3D coordinate system and the roof's surface normal is aligned to the z-axis of the 3D coordinate system. The computer system may utilize a number of methods for alignment, including a normal alignment method and an iterative closest point method. Alignment may additionally or alternatively include aligning each of the shingle point clouds. The normal based alignment method causes the computer system to identify the median or average normal of each shingle point cloud. The computer system may then align the centroid of each shingle point cloud to (0,0,0) and align the median normal of each shingle point cloud to the vector facing (0,0,1). In other embodiments, the computer system may use the iterative closest point (ICP) method during alignment.

In some instances, the computer system may identify clusters (i.e., groups) of shingle point clouds (block 715). One of ordinary skill in the art will appreciate that numerous clustering methods may be implemented to identify such clusters or groups, any one of which may be implemented in accordance with block 715. Accordingly, the subsequently described examples serve illustrative purposes only and are non-limiting in nature. For example, the shingle point clouds may be grouped by size and/or shape. The computer system may implement clustering methods such as the k-medoids method to separate the shingles into separate groups. In implementing such a method, selecting the initial cluster centers may be performed by selecting the first medoid uniformly at random. A medoid may be a point in a shingle point cloud whose average dissimilarity to all the points in the shingle point cloud is minimal. In some instances, the medoid of a shingle point cloud is the most centrally located point in the shingle point cloud. The computer system may calculate the difference in the dimensions of the bounding box that encloses the first medoid. The computer system may select the next medoids based on the shingle point clouds that have the largest variance between the initial medoid. This may result in an initial set of medoids that are already separated into bins by their shape and only require a few iterations to converge. In some embodiments, the computer system may implement a k-means method for identifying clusters of shingle point clouds using the "model shingle" as a mean.

The computer system may then detect points corresponding to potentially damaged sections of each shingle (i.e., damage extraction) (block 720). In order to detect said points, a model shingle point cloud representing an undamaged shingle may be created (model). In some instances, the model represents an average of all of the scanned shingles on the roof. While damage will vary from shingle to shingle, normal wear and tear will generally be consistent across all shingles. Thus, the significance of most shingle damage will be negligible when creating the model, while wear and tear consistent across the majority of the shingles will generally be accounted for in the model. As discussed in further detail below, the model may be compared to each of the shingle point clouds by comparing the coordinate positions of the points in the model to the coordinate positions of the points in each of the shingle point clouds. Any outlier points in the shingle point clouds (i.e., any point with a nearest-neighbor point in the model shingle that exceeds a certain threshold) may be identified as damaged points or potentially damaged points (damaged points). The damaged points may be mapped to a point cloud, and in particular, to the original roof point cloud.

In some embodiments, creating a model shingle point cloud may comprise transforming the shingle point clouds so that the shingles share a common alignment. In one embodiment, the transformation may be implemented using an iterative closest point (ICP) method. The computer system may manipulate two shingle point clouds at a time, continually transforming the two shingle point clouds until either the sum of the distances between the points is lower than a given threshold, or a maximum number of iterations is reached. This ICP method may be implemented with regard to some or all of the shingle point clouds to give the shingle point clouds a common alignment.

The computer system may filter the resulting points using, for example, a voxel grid down sampling of the points. A voxel grid down sampling may create boxes of a specified width and all the points that lie inside one box may be reduced down to their centroid. The computer system may then automatically select a classification threshold for each shingle point cloud by iterating through each of the shingle point clouds and selecting points at random. The computer system may obtain each point's k nearest-neighbors in the model and compute the mean and/or standard deviation of the squared Euclidean distances over the points. The threshold of a shingle point cloud may be selected based on a scaled number of standard deviations away from the mean, where the scaled value is a parameter.

After generating one or more models and/or identifying thresholds for shingle point clouds, the computer system may identify points of potential damage within the shingle point clouds by comparing, point-by-point, one or more points from the model(s) to one or more points from the shingle point cloud(s). In some embodiments, when any point in the model is farther than the specified threshold away from its nearest-neighbor in the shingle point cloud, the point in the model may be marked as damage or potential damage. The computer system may take the points marked as damage in the model point cloud and map them back to points in the original dataset (i.e., the roof point cloud). This mapping back to the original dataset may be advantageous because the points in the model may not represent real points in the shingle. Further, mapping the points to the shingle point cloud may result in losing points along the edge, or may result in damaged segments that may not be included in the shingle point cloud. A method is briefly outlined below (this does not include transforming the clouds to new coordinate frames for comparison):

```
Foreach region in regionGrownClouds:
    Foreach point in model:
        neighbor = region.narestNeighborTo(point)
        distance = neighbor.getDistanceTo(point)
        If (distance > threshold):
            damagePoints.add(point)
```

```
Foreach point in damagePoints:
    neighbor = dataset.nearestNeighborTo(point)
    damagePoints.add(point)
return damagePoints
```

After detecting damaged points for each shingle, the computer system may segment the damaged points into clusters of points that may be considered a single cluster of damage (i.e., damage segmentation) (block 725). While an isolated single damage point is unlikely to represent a significant physical feature (it may represent a measurement error, for example) and thus unlikely to represent an area of damage to be concerned about, a cluster of damaged points likely represents physical features consistent with a damaged area. Damage segmentation may enable the computer system to use the clusters for classification training. Damage segmentation may be carried out by the computer system using methods such as Euclidean clustering.

Once clusters of damage have been identified, the computer system may reduce the effects of noise in the shingle point clouds by identifying false positives (i.e., clusters that were likely misidentified as damaged regions). The computer system may implement classification methods to identify areas that were wrongly identified as damaged areas. For example, areas near shingle edges may sometimes be wrongly identified as damaged. This may be due to the fact that areas between shingles tend to have more variation in shape and position, making it difficult to identify a baseline for determining whether an area near or on the shingle edge is damaged. Learning models, such as support vector machines (SVM), that recognize patterns may be used to identify false positives.

Additional Considerations

The following additional considerations apply to the foregoing discussion. In some embodiments, the disclosed methods and systems may store, at a database, manually classified damage regions (i.e., classified by a user or estimator as, e.g., hail damage, not damage, fraud, etc.). The systems and methods may rely on the classified regions to help classify new damaged regions.

In some embodiments, the disclosed methods and systems may be used to determine a roof needs to be replaced based on the amount of damage showing on the roof, using the size and number of dents. Furthermore, the disclosed methods and systems may utilize models that account for different types of roof material, shingle size, and amount of wear already on the roof. Each of these roof parameters may be stored at a database and used to increase the accuracy of roof models.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inspecting a structure to estimate the condition of a structure through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method of estimating damage to a roof, the method comprising:

generating, by a processor, from a first point cloud representing a roof, a second point cloud representing a shingle, wherein generating the second point cloud representing a shingle comprises:

identifying, by a processor, a set of points, the set of points including one or more first points in the first point cloud;

determining, by a processor, a first measurement of a surface shape of the set of first points;

identifying, by a processor, one or more second points in the first point cloud;

adding, by a processor, the one or more second points to the set of first points;

determining, by a processor, a second measurement of the surface shape of the set of first and second points; and removing, by a processor, the one or more second points from the set of first and second points when the second measurement of the surface shape exceeds a threshold, wherein the first measurement and second measurement each relate to at least one of: (i) curvature; or (ii) smoothness;

the method further comprising:

comparing, by a processor, the second point cloud to a model point cloud, the model point cloud representing a model shingle;

identifying, by a processor, based on the comparison, a first set of points, correlating each point within the first set of points to a representation of a point of damage;

identifying, by a processor communicatively connected to a memory, a second set of points, the second set of points including at least one point from the first set of points, correlating the second set of points to a representation of a damaged region of the roof; and generating and storing to the memory a report based on the second set of points for subsequent retrieval and use in estimating damage to at least part of the roof.

2. The method of claim 1, further comprising:

identifying, by a processor, a group comprising the second point cloud, the group representing a collection of shingles sharing similar characteristics.

3. The method of claim 1, further comprising classifying, by a processor, the second set of points by determining a status of damage at the damaged region of the roof.

4. The method of claim 3, wherein determining a status of damage at said region on the roof comprises at least one of: (i) determining whether the damaged region of the roof was misidentified as damaged; or (ii) determining an extent of damage at the damaged region of the roof.

5. The method of claim 3, further comprising determining, by a processor, based at least in part on the status of damage at the damaged region of the roof, whether at least a portion of the roof needs to be replaced.

6. The method of claim 1, wherein region growing segmentation is utilized to generate, from a first point cloud representing a roof, a second point cloud representing a shingle.

7. The method of claim 1, wherein:
the first point cloud is updated by mapping the first set of points to the first point cloud; and
the second set of points comprises points from the updated first point cloud.

8. The method of claim 7, wherein identifying, by a processor communicatively connected to a memory, a second set of points comprises utilizing a Euclidean clustering method.

9. The method of claim 1, wherein comparing, by a processor, the second point cloud to a model point cloud comprises utilizing an iterative closest point method to align the second point cloud and the model point cloud.

10. A tangible computer-readable medium including non-transitory computer readable instructions that, when executed at one or more processors of a system for identifying roof damage, execute a method of:
generating, from a first point cloud representing a roof, a second point cloud representing a first shingle;
comparing the second point cloud to a model point cloud, the model point cloud representing a model shingle;
identifying, based on the comparison, a first set of points;
correlating each point within the first set of points to a point of damage to the first shingle;
identifying a second set of points, the second set of points including at least one point from the first set of points,
correlating the second set of points to a damaged region of the roof; and
storing the second set of points to the memory for subsequent retrieval and use in estimating a condition of at least part of the roof,
wherein generating the second point cloud representing a first shingle comprises:
identify a set of points, the set of points including one or more first points in the first point cloud;
determining a first measurement of a surface shape of the set of first points;
identifying one or more second points in the first point cloud;
adding the one or more second points to the set of first points;
determining a second measurement of the surface shape of the set of first and second points; and
removing the one or more second points from the set of first and second points when the second measurement of the surface shape exceeds a threshold,
wherein the first measurement and second measurement each relate to at least one of: (i) curvature; or (ii) smoothness.

11. The tangible computer-readable medium of claim 10, wherein the instructions, when executed, further execute a method of classifying the second set of points by determining a status of damage at the damaged region of the roof.

12. The tangible computer-readable medium of claim 11, wherein the instructions, when executed, further execute a method of determining, based at least in part on the status of damage at the damaged region of the roof, whether the roof needs to be replaced.

13. The tangible computer-readable medium of claim 10, wherein the instructions, when executed, further cause execute a method of updating the first point cloud by mapping the first set of points to the first point cloud, wherein the second set of points includes points from the updated first point cloud.

* * * * *